May 1, 1951 W. C. YOUNG 2,550,951
APPARATUS FOR TESTING MAGNETIC PROPERTIES OF CORES
Filed May 20, 1948 2 Sheets-Sheet 1
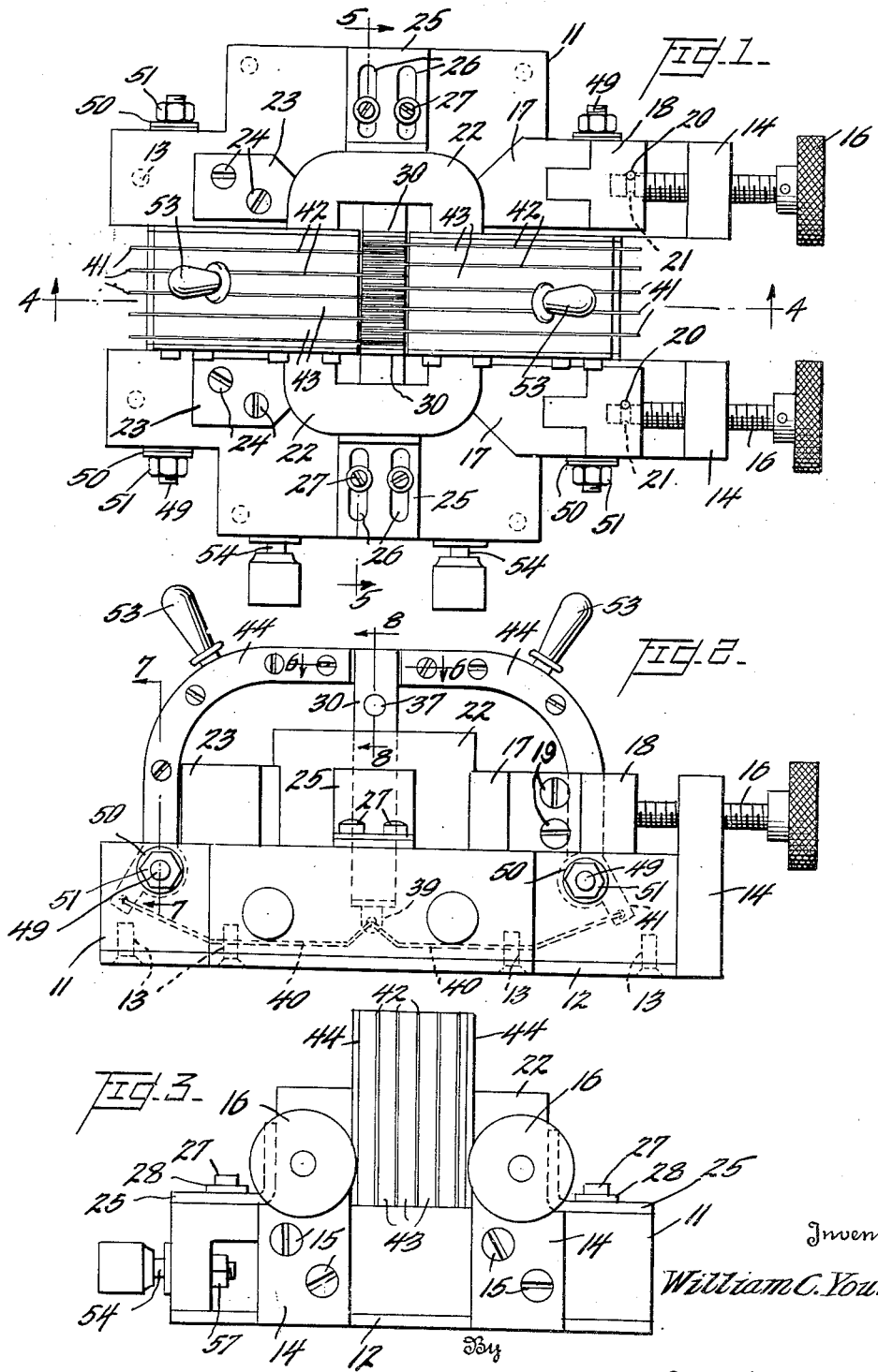
Inventor
William C. Young,
By
C. B. Hamilton
Attorney

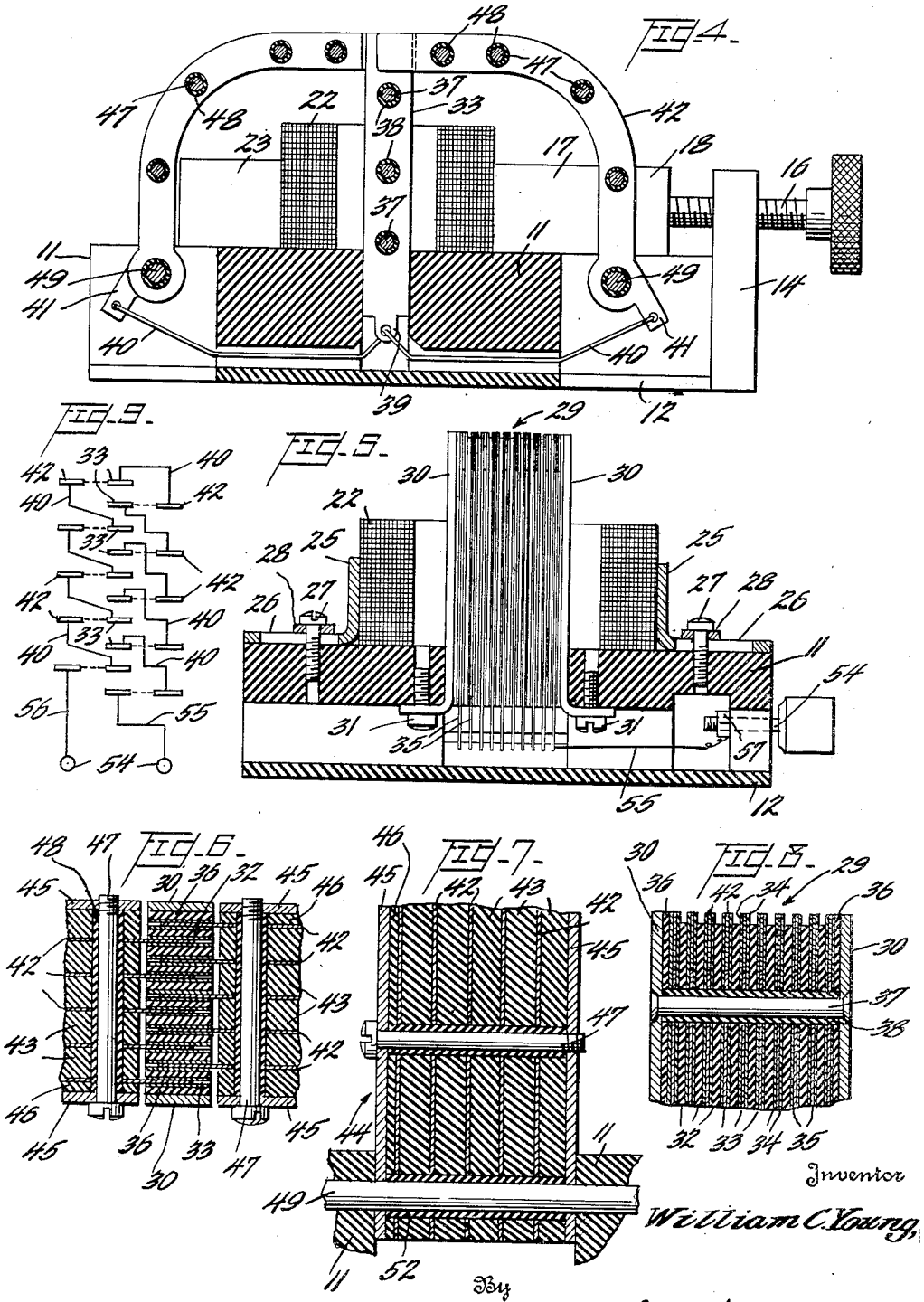

Patented May 1, 1951

2,550,951

UNITED STATES PATENT OFFICE 2,550,951

APPARATUS FOR TESTING MAGNETIC PROPERTIES OF CORES

William C. Young, Winston-Salem, N. C., assignor to Western Electric Company, Incorporated, New York, N. Y., a corporation of New York Application May 20, 1948, Serial No. 28,238

14 Claims. (Cl. 175—183)

1

This invention relates to apparatus for testing magnetic properties of cores used in electrical coils and more particularly to an apparatus for quickly testing the said cores by encircling the core with a plurality of split turns of conducting metal.

In the manufacture of transformers, loading coils, reactors, etc., it is often necessary to test the core for certain requisite electrical characteristics. These tests must be made very quickly in order to avoid any delay in the assembly line methods commonly used in production of this type. Through the use of quick split turn testing of the coil cores, it is possible to discard poor cores before the permanent coil windings are placed thereon which winding is time consuming and expensive.

The testing of cores for magnetic properties requires subjecting the test core to the effects of an electromagnetic field produced by a coil. In such cases it is necessary for the coil to encircle the core. This is easily accomplished with a cylindrical core member for it may be easily inserted into a fixed coil and removed at completion of the test but a toroidal core member usually requires that a separate coil be wound around each core. The latter is a very time consuming process, whereas a quick operating split turn fixture results in considerable saving in time and expense.

Accordingly, one of the principal objects of this invention is to provide a quick operating split turn fixture for testing cores for electrical coils wherein two opposite sets of arcuate conducting strips are pivotally mounted on a base for motion toward each other in order to engage a series of blade receiving jacks whereby the conducting strips and the receiving jacks are interconnected so as to form a continuous conductor consisting of a plurality of turns looped about the core to be tested.

Other objects and advantages will be apparent from the following detailed description when taken in conjunction with the accompanying drawings, in which, Fig. 1 is a top plan view of a split turn testing fixture embodying the features of the present invention;

Fig. 2 is a front elevational view of the fixture;

Fig. 3 is an end view thereof;

Fig. 4 is a front sectional view taken along line 4—4 in Fig. 1;

Fig. 5 is a cross sectional view taken along section 5—5 in Fig. 1;

Fig. 6 is a partial sectional view taken along

2 section line 6—6 in Fig. 2 and showing the cooperation between the arcuate conducting strips and the blade receiving jacks;

Fig. 7 is a cross sectional view taken along line 7—7 in Fig. 2 which discloses the manner of combination of the plurality of arcuate conducting strips and the pivoted attachment to the base member;

Fig. 8 is a fragmentary sectional view taken along line 8—8 in Fig. 2 showing the upper extremity of the blade receiving jacks;

Fig. 9 is a schematic circuit diagram showing the stepped relationship existing between the fixed and movable contacts.

Referring now to the drawings, the test fixture comprises a base supporting member 11 composed of a dielectric material such as a phenol fiber and formed with a plurality of passageways on the lower surface which are covered by a base plate 12. The base plate 12 is removably secured to the body of the base member 11 by means of screws 13 to facilitate removal for inspection and repair. Two supporting members 14 are attached to the base member 11 by a plurality of screws 15.

Extending through the supports 14 are two adjustable thumb screws 16 which actuate a pair of separately laterally adjustable core positioning blocks 17. Each core positioning block 17 is attached to a journal block 18 by means of screws 19 so that the core positioning block 17 may be removed at any time and another block adapted for a different size core fixed to the journal block 18. A pin 20 which bears against a groove 21 in the thumb screw 16 prevents withdrawal, yet permits freedom of rotation of thumb screw 16 within the journal block 18. The face of each positioning block 17 is molded so as to form a curved surface adapted to engage the outer surface of a magnetic core 22 to be tested.

Positioned directly opposite the adjustable core positioning blocks 17 are a pair of fixed core positioning blocks 23 affixed to the base member 11 by a plurality of screws 24. Inasmuch as blocks 23 must be adapted to receive many different sizes of test cores having varying shapes, one example of which is indicated at 22, the blocks 23 may be interchanged with other blocks of various sizes.

A pair of core positioning brackets 25 are placed at right angles to the previous pairs of core positioning blocks 17 and 23 to form an inner opening for receiving the core to be tested. As shown in Fig. 5, each bracket 25 is moved into adjusted position for a particular size core through a slot 26 in the bracket cooperating with a screw 27. Tightening of the screw 27 on a washer 28 clamps the bracket 25 to the base member 11. The brackets 25 function to align the ends of the test core 22 so that it will be placed in proper position for testing and to prevent distortion thereof.

Extending laterally along the line connecting the two brackets 25 and positioned midway between the core positioning blocks 17 and 23 is a plurality of fixed contacts 29. A pair of brackets 30 secured by machine screws 31 to the underside of base member 11 support the contacts 29 which extend vertically through the opening in base member 11.

The assembly of fixed contacts 29 is formed of alternate strips of dielectric material 32 and contact blade receiving jacks 33 made of a suitable conducting metal such as Phosphor bronze. The contact blade receiving jacks 33 are composed of three conducting blades, two of equal length, blades 34, and one blade of a shorter length, 35. The longer blades 34 are placed on either side of the shorter blade 35 so as to form a blade receiving jack. This jack is shown in Fig. 8 wherein the indentation is filled by a movable contact blade 42. The alternately arranged dielectric strips 32 and blade receiving jacks 33 are insulated from the supporting bracket 30 by additional dielectric spacers 36. A plurality of rivets 37 passing through the dielectric sleeves 38 secure the plurality of contacts 29 and the supporting brackets 30 together as an integral unit.

At the lower extremity of the shorter blade 35 is an integral connection lug 39 to which is connected one end of a flexible conducting wire 40. The other end of the wire 40 is connected to a connection lug 41 at the lower extremity of the movable conducting blade 42. The conducting blade 42 is one of a plurality of such blades which are alternately arranged with dielectric spacers 43 so as to form two sets of movable contact arms 44; one set 44 positioned to the right and the other set 44 positioned to the left of the middle fixed blade receiving jacks 33. The plurality of blades 42 and spacers 43 are insulated from an arcuate supporting structure 45 by means of an additional dielectric spacer 46.

The contact arms 44 comprising the various spacers, blades and supporting structure are secured together by means of screws 47 which pass through the dielectric sleeves 48 so as to prevent any electrical short circuits between the conducting blades 42. The contact arms 44 are pivoted by means of stud bolts 49 which pass through base member 11 and are secured at each end by washers 50 and nuts 51. Another dielectric sleeve 52 protects the conducting blades 42 from short circuits through the stud bolt 49. A handle 53 composed of a dielectric material is fastened to each of the movable contact arms 44 so as to facilitate moving the arms into and out of engagement with the fixed block receiver 29.

Thus the movable blades 42 are connected in a stepped arrangement to the fixed blade receiving jacks 33 both as hereinbefore explained and as illustrated in the schematic electrical diagram of Fig. 9. One of a pair of test terminals 54 is connected to a fixed contact 33 by flexible conductor 55 and the other to a movable contact 42 by flexible conductor 56. The test terminals 54 are attached to the base member 11 by means of nut 57 and are used as means for connecting any desired type of test instrument to the testing fixture.

With the foregoing detailed description, it is believed that the general operation of the apparatus may now be understood. The core positioning brackets 25 are placed into proper alignment for the size and type of core to be tested by means of a slot 26 and a screw 27. Tightening the screw 27 on a washer 28 clamps the bracket 25 to the base member 11 in proper position for testing. The core positioning blocks 23 which are adapted to receive the size of core to be tested are clamped to the base member 11 by means of machine screws 24. A core 22 to be tested is placed on the base member 11 so that the fixed or stationary contacts 29 extend upwardly through the opening in the center of the core. The thumb screws 16 may then be tightened so as to position and hold the core in perfect alignment for testing as shown in Figs. 1, 2 and 4.

Then the right and left movable contact arms 44, hithertofore open, are closed by moving their handles 53 so that the entire plurality of movable contact blades 42 make electrical connection with their respective blade receiving jacks 33. These electrical connections between the fixed contacts 33 and the movable contacts 42 close the open circuits indicated between the adjacent blocks in the circuit diagram of Fig. 9 and forms a continuous conductor of two connected coils encircling two opposite portions of the core to be tested. These two oppositely formed coils are composed of an equal number of electrical turns so that each of the two portions of the test core are subjected to the same amounts of electromagnetic induction. The continuous coil formed by the closing of the contacts may be traced from the test terminal 54 through the conductor 55 to and through a fixed blade receiving jack 33 through its companion movable blade 42 at the right, now connected therewith as indicated by the dotted line in Fig. 9, through conductor 40 to blade receiving jack 33. Connection is made in this manner between the right hand movable blades 42 and the alternate blade receiving jacks 33 until the last jack 33 at the opposite end is reached, which completes one test section of the continuous coil. This end jack 33 is connected to a movable left hand blade 42 positioned directly opposite to the set of right hand blades 42 and the remainder of alternate jacks 33 are interconnected with the other left hand movable blades 42 in the same manner as hereinbefore described. The last movable blade 42 on the left is connected to the second test terminal 54. Any suitable test instrument connected to the test terminals 54 will indicate the quality of the core 22 under test.

Upon completion of the testing of core 22, it is merely necessary to move the contact arms 44 to open position by means of the handles 53 and loosen the thumb screws 16 in order to remove the tested core, whereby a succession of cores can be quickly tested.

It is to be understood that the above described arrangements is merely illustrative of the application of the principles of this invention. Numerous other arrangements may be readily devised by those skilled in the art which will embody the principle of the invention and fall within the spirit and scope thereof as defined by the appended claims.

What is claimed is:

1. Apparatus for testing cores comprising a base, a plurality of pairs of complementary adjustable brackets attached to the base for positioning and clamping a core thereon, a plurality of fixed electrical contacts having their lower portions positioned and secured within the base member, and a plurality of movable contacts which are pivoted to the base member so as to electrically interconnect with the fixed contacts to form a plurality of conductor turns as a single coil about the core.

2. Apparatus for testing cores comprising a base, a plurality of pairs of oppositely positioned adjustable core positioning brackets supported by the said base, a plurality of insulated conducting blades which are pivotally mounted on said base, a row of insulated conducting blade receiving jacks fixedly positioned between and adapted to receive the pivoted conducting blades, and flexible conductors for electrically interconnecting the blades and the blade receiving jacks so as to form a plurality of conducting turns looped around the core.

3. In a quick operating test fixture for a magnetic core, a base, a plurality of pairs of complementary adjustable brackets thereon for laterally positioning and holding a magnetic test core, a fixed row of electrical contacts adjacent to the test core and secured to the base, contact means pivoted to said base for cooperating with the row of fixed contacts, and flexible conductors electrically interconnecting the fixed and the movable contact means in a stepped arrangement to produce a continuous conductor of a plurality of turns about the test core.

4. Apparatus for testing cores comprising a base, a plurality of pairs of complementary adjustable members thereon for positioning a test core, a plurality of fixed contacts, a plurality of movable pivoted contacts adapted to make contact with the fixed contacts, means for pivoting the movable contacts into engagement with the fixed contacts, and means electrically interconnecting one extremity of the movable pivoted contacts with the adjacent extremity of the fixed contacts so that the connection of the movable contacts to the fixed contacts will produce a continuous conductor in a coil about the test core.

5. Apparatus for testing cores comprising a base member, a plurality of contacts fixed to the base member, means permanently and flexibly interconnecting an extremity of the fixed contacts with an extremity of a plurality of movable contacts, and means for connecting the unconnected extremity of the fixed contacts with the free extremity of the movable contacts so as to form a continuous conductor of a plurality of turns about a core under test.

6. Apparatus for testing cores comprising a base member, a plurality of contacts fixed thereon, a plurality of movable contacts pivoted to the base member, and flexible conductors electrically interconnecting the fixed and movable contacts so that a continuous conductor in the form of a test coil is provided about a core under test when the fixed contacts engage said movable contacts.

7. Apparatus for testing cores comprising a base member, adjustable means thereon for positioning cores of various sizes in a predetermined location, a plurality of contacts fixed to the base member, a plurality of movable contacts pivotally mounted to the base member, and means interconnecting the fixed and the movable contacts for forming a continuous conductor of a plurality of turns about the core under test.

8. Apparatus for testing cores comprising a base member, a plurality of contacting devices having alternate strips of dielectric and conducting material which are fixedly mounted on the base member, means connecting an extremity of the conducting strips of the fixed contacts to conducting strips of a plurality of movable contacts, and movable contact means having alternate dielectric and conducting strips movably mounted on the base member and adapted to contact the unconnected extremity of the fixed contact so as to form a continuous conductor in a coil about a core under test.

9. In an apparatus for testing the magnetic properties of a toroidal core, a base, a plurality of coil segments fixed to the base, a plurality of coil segments pivotally secured to the base each of which has one of its extremities electrically and flexibly connected to an extremity of a fixed coil segment, and means to move the open ends of the pivotally mounted coil segments into engagement with the fixed coil segments to form a plurality of turns surrounding a portion of the toroidal core.

10. In a fixture for testing a toroidal core, a base, complementary adjustable brackets thereon for positioning and holding the core under test, a group of coil segments insulated from each other and fixed to the base, a second group of coil segments insulated from each other and pivotally secured to the base, and means permanently and flexibly connecting predetermined coil segments of said first group to predetermined segments of said second group, each of said second group of coil segments adapted to engage a coil segment in the first group to produce a continuous coil surrounding a section of a toroidal core placed between the two groups of coil segments.

11. A test fixture comprising a plurality of adjustable gauge blocks, means to move the gauge blocks to position and hold a test piece within the fixture, a plurality of fixed coil segments, and a plurality of movable coil segments adapted to engage the fixed coil segments to form a continuous coil which surrounds a portion of the test piece.

12. Apparatus for testing cores comprising a base, a plurality of stationary coil segments fixed to the base, a first group of movable coil segments pivoted to the base and positioned on one side of the stationary coil segments, a second group of movable coil segments pivoted to the base on the other side of the stationary coil segments, means permanently and flexibly interconnecting one extremity of each of the stationary coil segments with one extremity of each of the movable coil segments, and means for moving the other extremities of the movable coil segments into engagement with the stationary coil segments and electrically interconnecting the stationary and movable segments to form two connected coils encircling the core under test.

13. Apparatus for testing toroidal cores of magnetizable material comprising a base member composed of dielectric material, said base member having recessed passageways in the lower surface thereof, a plurality of pairs of adjustable clamping members for accurately positioning toroidal cores of various sizes on the base member, a plurality of fixed contacts secured to the central part of the base member and extending vertically upward therefrom, said fixed contacts being centrally located with respect to the pairs of clamping members, a plurality of movable coil segments hingedly secured to the base member and adapted to be moved into contact with the upper extremities of the fixed contacts, flexible conducting wires disposed in said recessed passageways and alternately connecting the fixed and movable contacts to form a continuous conductor in a coil about the toroidal core when the movable coil segments are moved into contact with the upper extremities of the fixed contacts, and a base plate removably secured to the bottom of the base member for covering the passageways and the flexible conductors contained therein.

14. Apparatus for testing toroidal cores comprising a base member, adjustable clamping means on the base member adapted to clamp and center a toroidal core in the test apparatus, a plurality of fixed vertical conducting units each comprising three conducting strips including one short conducting strip enclosed between two longer strips, the two longer strips projecting above the short strip at its upper end to form a pocket or jack and the short strip projecting below the lower ends of the two longer strips, each short strip being connected by a flexible conductor at its lower end to one of a plurality of movable arcuate spaced apart conducting strips, said plurality of movable conducting strips being hingedly mounted on the base member and adapted to be moved into electrical contact with the pocket or jack formed by the upper ends of the fixed conducting strips to produce a continuous conducting coil around a core under test.

WILLIAM C. YOUNG.

REFERENCES CITED

The following references are of record in the file of this patent:

UNITED STATES PATENTS

| Number | Name | Date |
|---|---|---|
| 1,444,524 | Pridham et al. | Feb. 6, 1923 |
| 1,565,519 | Spooner | Dec. 15, 1925 |
| 1,570,948 | Crouch | Jan. 26, 1926 |
| 1,695,677 | Berlowitz | Dec. 18, 1928 |
| 2,439,827 | Sterenbuch et al. | Apr. 20, 1948 |